United States Patent [19]
Cooley et al.

[11] Patent Number: 4,585,163
[45] Date of Patent: Apr. 29, 1986

[54] VARIABLE AIR VOLUME SYSTEM CONTROL

[75] Inventors: Stephen E. Cooley; Martin J. Jensen, both of Madison, Wis.

[73] Assignee: Wehr Corporation, Milwaukee, Wis.

[21] Appl. No.: 702,232

[22] Filed: Feb. 15, 1985

Related U.S. Application Data

[63] Continuation of Ser. No. 508,808, Jun. 28, 1983, abandoned.

[51] Int. Cl.$^4$ ............................................... F24F 7/00
[52] U.S. Cl. ................................. 236/49; 236/78 D; 251/129.13
[58] Field of Search ............. 236/49, 46 F, 1 B, 78 D, 236/78 C, 76; 165/16, 12, 26; 251/133, 135

[56] References Cited

U.S. PATENT DOCUMENTS

| | | | |
|---|---|---|---|
| 3,443,121 | 5/1969 | Weisbrod | 236/46 F X |
| 3,677,335 | 7/1972 | Weatherston | 165/12 |
| 3,797,560 | 3/1974 | Zaharoni | 165/26 |
| 4,244,517 | 1/1981 | Stanke et al. | 236/49 |
| 4,290,274 | 9/1981 | Essex | 236/46 F X |
| 4,406,397 | 9/1983 | Kamata et al. | 236/1 B |

*Primary Examiner*—Harry Tanner

[57] ABSTRACT

An electronic control for positioning the damper in the air supply duct of a variable air volume system having a motor to open and close the damper, a thermostat circuit sensing temperature in a conditioned space and developing a voltage signal indicative of the temperature in the space relative to the thermostat setting, an electronic air flow sensing circuit sensing air flow into the conditioned space and developing a voltage signal indicative of air velocity, a circuit processes both signals and applies the difference between them to an electronic variable timer which effectively varies the motor speed (by varying the motor duty cycle) so said damper is moved slower as equilibrium between the space temperature and the set point of the thermostat is approached. The same voltage signals are fed into a logic circuit to determine the direction of motor rotation to determine whether the damper opens or closes.

13 Claims, 6 Drawing Figures

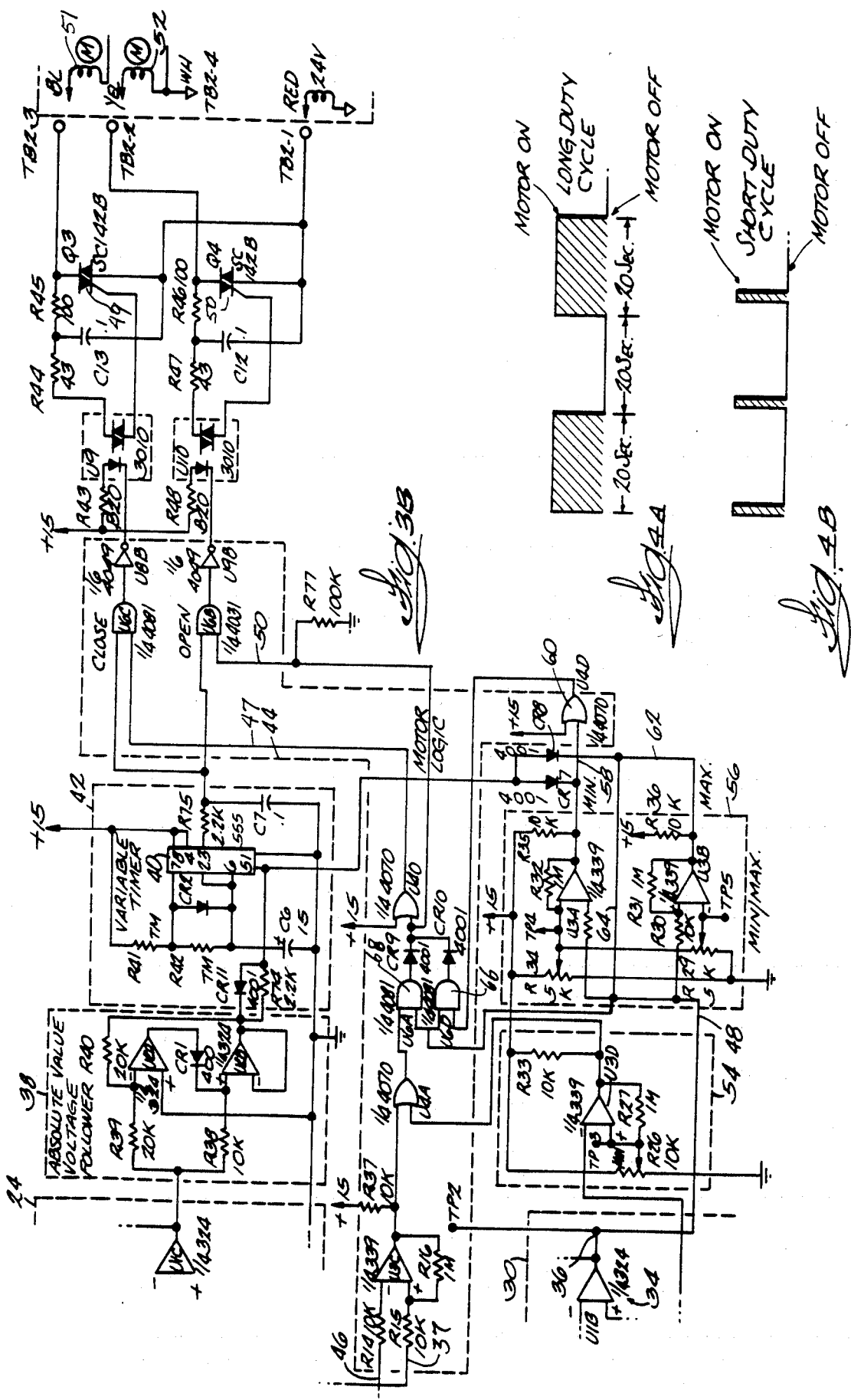

VARIABLE AIR VOLUME SYSTEM CONTROL

REFERENCE TO RELATED APPLICATION

This is a continuation application of Ser. No. 508,808, filed June 28, 1983, abandoned.

BACKGROUND OF THE INVENTION

Variable air volume (VAV) systems are widely accepted as energy efficient means of obtaining zone control of temperature. A variable air volume system supplies a constant temperature of air (55°) while adjusting the position of a damper in the air supply duct to vary the volume of air supplies to the space. The volume of air changes to compensate for changing loads in the zone to maintain a constant temperature. A properly designed VAV system can reduce operating costs by as much as 50%. The great majority of VAV controllers are based on a pneumatic system which uses a large air compressor and associated tubing in the control, i.e., the thermostats and the positioning arrangements. Electronic controls appear attractive for smaller installations, retrofit situations and where optional features are desired. Furthermore, with the ever decreasing cost of electronic components, logic chips and elements, it is likely electronic controls will become increasingly attractive.

SUMMARY OF THE INVENTION

The object of this invention is to provide a variable air volume system utilizing electronic controls to position the damper in such a way as to rapidly obtain the equilibrium conditions with minimum or no overshoot or oscilliation. Equilibrium conditions prevail when the space temperature is close to the set point of the thermostat and conditions are stable. A further object of this invention is to provide an electronic control for a VAV system which makes rapid adjustments of the damper position when the space conditions are far from the set point of the thermostat and decreases the speed of adjustment as the equilibrium point is approached.

The system will control the movement of the damper in the opening or closing position dependent upon the sensed conditions in the system. The sensed conditions feed into the logic section of the system to control the motor direction and are also factored into the system determining the speed of adjustment. The sensed conditions result in an electronic signal generated by a thermostat and an air velocity signal generated by two sensors connected to eliminate the temperature of the air from influencing the air velocity determination. The air velocity signal (derived from the two sources) and the temperature signal are amplified and supplied to an electronic circuit which subtracts one from the other and applies that signal to an electronic variable time which will provide for variation of the "on" time of the motor driving the damper which "on" time will be longer as the space conditions are further from equilibrium. Thus, in effect, the system adjusts the speed of the motor and the speed of adjustment.

BRIEF DESCRIPTION OF THE DRAWINGS

FIG. 4 constitutes two representations, 4a and 4b, of variations in the motor operating cycle.

DETAILED DESCRIPTION OF THE DRAWINGS

Figure 1:
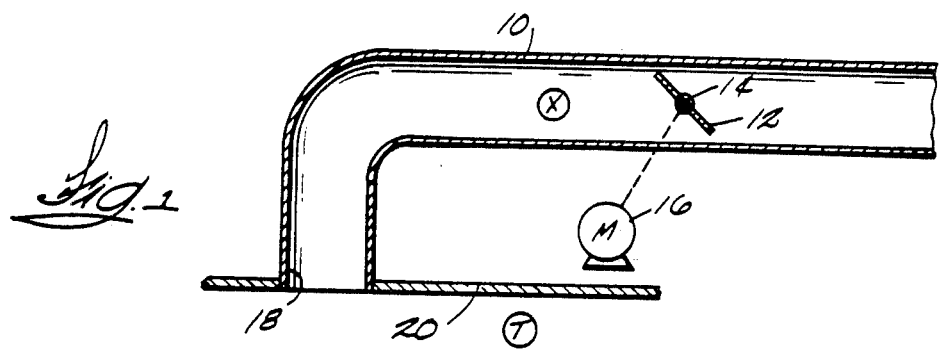
FIG. 1 is a schematic representation of an air supply duct having a damper therein positioned by a motor and providing air to the conditioned space (room) below.
Figure 2:
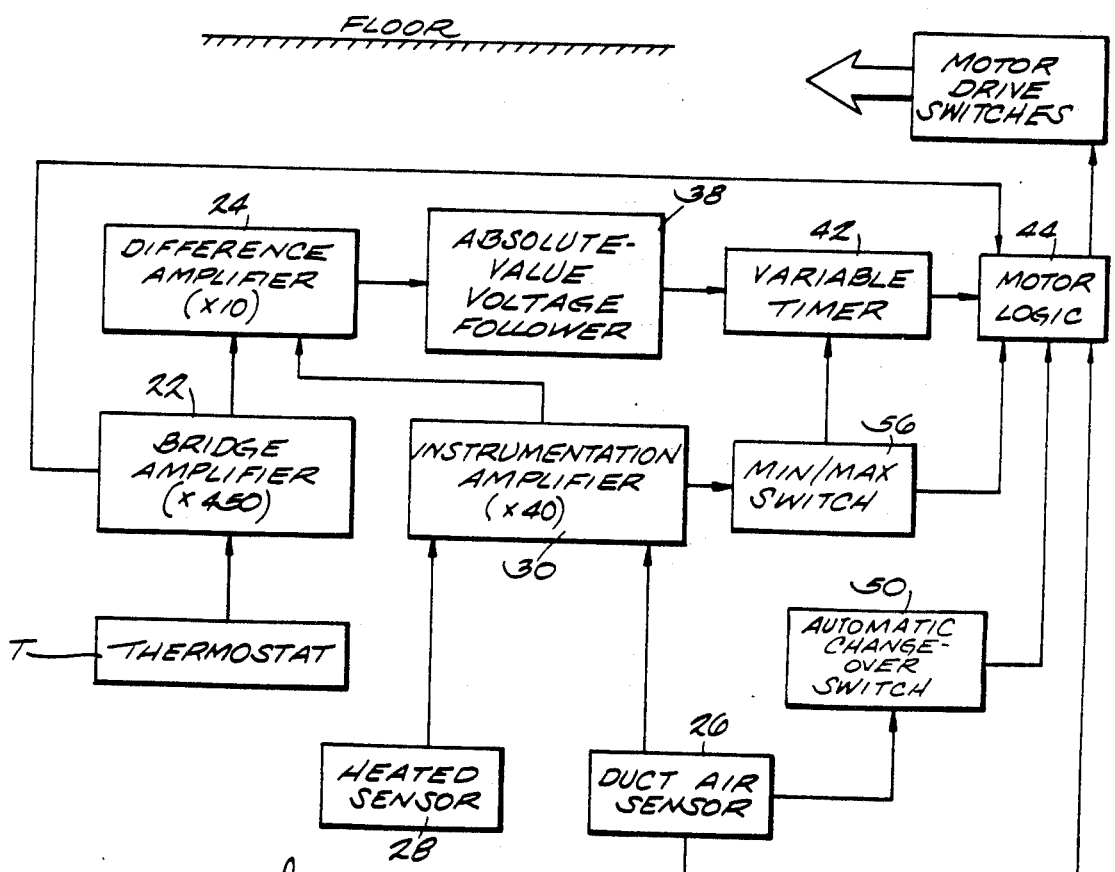
FIG. 2 is a block diagram of the control scheme used in this invention.
Figure 3A:
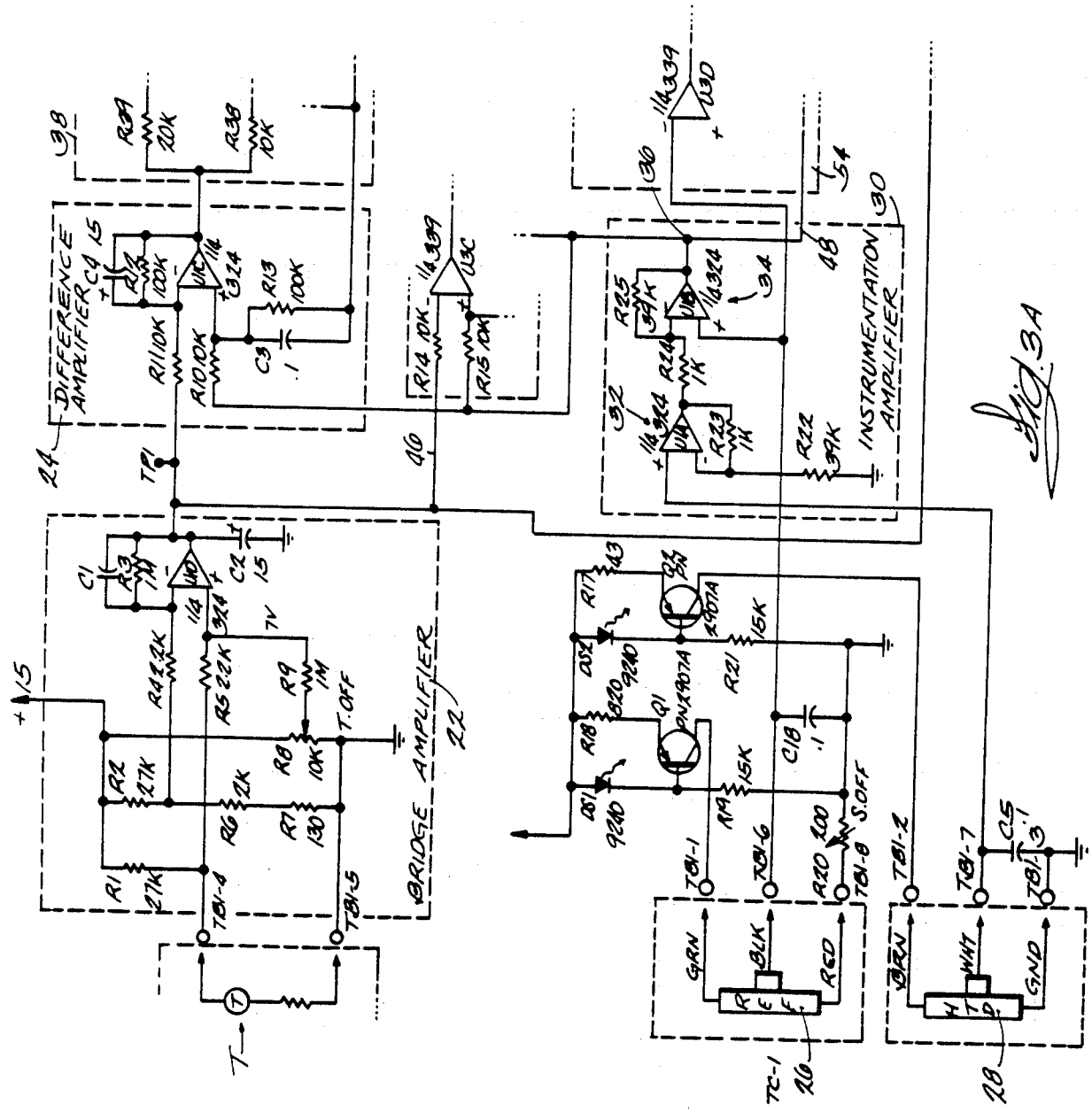
FIG. 3 is a schematic wiring diagram of the control scheme and it will be understood that the component identifications represent a specific circuit, but other equivalent circuits can be utilized. The designations employed in this manner eliminate the necessity of specific recital of the values and identifications in the description hereafter except where relevant.

In a variable air volume system, the air supplied to the conditioned space is at a substantially uniform temperature (55° F.) and the volume of air is varied to suit the requirements. Thus, in the variable air volume system shown schematically in FIG. 1, the air supply duct 10 is provided with a damper (valve) 12 rotatable on shaft 14 by means of an AC motor 16, which can move the valve to open or close it as necessary. The duct supplies air through an opening 18 in the ceiling 20 to the room below. The room is provided with a room thermostat on the wall as indicated by T and air flow sensors are located in the duct, for example at X.

The room thermostat T is of the thermistor type in which the resistance varies with temperature. With this particular thermostat the output signal varies in magnitude depending on the magnitude of the discrepancy between the temperature in the space and the setting of the thermostat. The output signal is applied to the bridge amplifier 22 which will produce a voltage of +7 volts when the space temperature is equal to the setting (set point) of the thermostat. If the space or zone temperature drops 1-½° F., the bridge amplifier output increases to +14 volts and if the zone temperature rises 1-½° F. above the set point the output voltage drops to 0 volts. The bridge amplifier output voltage decreases as the space temperature increases from 1-½° below the set point to 1-½° above the set point. The bridge amplifier output voltage is applied to the inverting input of the operational amplifier (op amp) in the difference amplifier 24.

Air flow in the duct 10 is measured at some point generally designated X, by means of two LM3911 (National Semiconductor) temperature transducers 26, 28, the latter being heated. The air flow voltage from the heated transducer 28 is proportional to the velocity of the air passing over the transducer and the instrument amplifier 30 subtracts that voltage from the voltage produced by transducer 26. The sensor 26 voltage changes with air temperature, not air flow. The voltage output of the heated sensor 28 is proportional to the velocity of the air flowing over it (the cooling effect). The combination of the two voltages in the instrument amplifier produces a velocity sensor independent of temperature. Thus, the output of the heated transducer is applied to the non-inverting input of the op amp 32 while the output of transducer 26 is applied to the non-inverting input of op amp 34. The amplified output of 32 is applied to the inverting input of op amp 34. The output of the instrumentation amplifier 30 at junction 36 is applied to the non-inverting input of the op amp in the difference amplifier 24. It may be noted the output of the air flow sensors and instrumentation amplifier will produce a voltage which changes with air velocity, i.e., the voltage will decrease with increasing air velocity with the output voltage typically ranging between 4 to 12 volts.

The difference amplifier subtracts the bridge amplifier (temperature) voltage from the air flow voltage. The output voltage of the difference amplifier is then made positive in the absolute value voltage follower 38 and the positive output is representative of the difference between the air flow voltage signal and the temperature signal. The signal is applied to the control input of the 555 variable timer chip 40 in section 42 of the circuit.

The control circuit is designed to energize the motor 10 to open or close the damper and to vary the time the motor is energized in either of those directions depending upon how close the space temperature is to the set point. The motor actuates the damper fast enough so it would likely overshoot an equilibrium point. For this reason, the net voltage output of the difference amplifier is applied to the 555 variable timer which decreases the "on" time of the motor as the temperature and flow voltages approach equilibrium. This eliminates oscillations and overshoot around the equilibrium point. Under the maximum duty cycle shown in FIG. 4a, there will be about 20 seconds "on" and about 20 seconds "off" motor duty cycle. As equilibrium is approached, for example, you could get the duty cycle shown in FIG. 4b, where the motor is "on" for only about 2 seconds (in practice the minimum "on" time will be about 1 second) of the available 20 second "on" cycle and the "off" cycle remains about 20 seconds. In effect, the timer varies the motor speed (RPM etc.) by varying the percentage of available "on" time that the motor is energized. The 555 variable timer provides for speed control but does not dictate the direction of motor rotation.

Direction control is accomplished in the motor logic circuit 44 which receives an input through lead 46 from the output of the bridge amplifier (the temperature voltage signal) as well as an input through lead 37 from the output of the instrumentation amplifier (the air flow voltage signal). The motor logic circuit compares the temperature voltage signal and the flow voltage signal and if the temperature voltage is the higher of the two the logic will provide a signal to lead 47 and the electronic switching circuit to cause Triac 49 to conduct to energize the winding 51 in the damper motor to rotate the motor in the direction to close the damper. Similarly, if the temperature voltage is less than the flow voltage, then the logic circuit provides a signal to fire Triac 50 and energize windings 52 to drive the motor in the direction to open the damper.

The temperature and flow circuits respond to the changing damper position by approaching each other in value until they stabilize at an equilibrium point within 1-½° F. of the set point. Plotting the flow at different thermostat conditions produces a graph for all equilibrium points and demonstrate that 80% of the equilibrium points are within 1-½° F. of the temperature set point. That means that this control is capable of maintaining a very close control of the temperature in the space.

The motor is an AC motor which can be stalled indefinitely without damage. Thus, if the damper is driven to full open or full closed position and stalled there the motor will not be harmed.

The system is provided with an automatic changeover switch (constituting the circuit within the dashed line 54) to change the operating mode if duct temperature goes too high. The switch receives a signal direct from the temperature transducer 26 and the circuit will respond when the temperature at the transducer 26 is 75°±5° to change the damper direction to convert the system from a modulating cooling source to a modulating heat source. The system will reset itself when the duct temperature drops below 70° at the transducer 26.

The circuit is provided with a minimum-maximum control comprising the circuit within the dashed lines 56. Both of the op amps in the min-max control are connected to the output of the instrumentation amplifier by lead 48. If the air flow decreases below a preset minimum flow or increases above a preset maximum flow, the min-max control becomes operative. If the flow decreases below the minimum, the damper will be inhibited from closing further and will only be allowed to open. Similarly, when a maximum flow has been reached, the damper will only be allowed to close. The signal produced by the min-max switch when the minimum condition is obtained, is supplied through lead 58 to logic chip 60, while the max signal is provided through leads, 62, 64 to the logic chips 66, 68 in the motor logic circuit which selectively energizes the open and close windings 48, 52 of the damper motor.

As an optional feature a reheat control can be added to this system. This would be triggered by voltage from the bridge amplifier (i.e. space temperature) of 9 volts, 11 volts, and 13 volts corresponding to temperatures of ½°, 1° and 1-½° below the set point of thermostat. The control could provide up to 3 stages of re-heat.

While electronic controls have been at a cost disadvantage compared to a pneumatic system, the continuing reduction in cost of chips, op amps, etc. make this control attractive for small installations, retrofits and where the various options are desired.

We claim:

1. A control for positioning the damper in a variable air volume system, comprising, a motor for opening and closing a damper, thermostat means sensing temperature in a conditioned space and developing a voltage singal indicative of the temperature in the space compared to the thermostat setting, air flow sensing means positioned to sense the air flow into the conditioned space and developing a voltage signal indicative of air velocity, and timing means operative to always periodically energize said motor for some portion of a given repetitive time period and responding to both of said voltage signals to vary said portion and the effective speed of said motor to decrease the speed of the motor moving the damper as temprature in the space approaches the set point of the thermostat.

2. A control according to claim 1 including means responsive to both of said signals to energize the motor to drive the damper towards the open position or towards the closed position as appropriate to reach the equilibrium condition.

3. A control according to claim 2 in which the thermostat means develops a voltage signal which is indicative of the amount and direction of deviation of the space temperature from the set point.

4. A control according to claim 3 in which the thermostat means develops a voltage which decreases as such deviation goes from a predetermined number of degrees below the set point to a number of degrees above the set point.

5. A control according to claim 4 in which said air flow sensing means develops a voltage signal which is an inverse function of velocity.

6. A control according to claim 5 in which said timing means is an electronic timer and the difference between the two voltage signals is applied to said electronic timer and said timer varies the percentage on the available "on" time for the motor to vary the actual "on" time and thereby vary the effective motor speed as such difference approaches 0.

7. A control according to claim 6 including logic means operative to determine the direction of rotation of said motor with both of said voltage signals being applied to said logic means.

8. A control for positioning the damper in a variable air volume system, comprising,
   a motor for positioning a damper,
   first means sensing temperature in the conditioned space and developing a voltage signal indicative of space temperature,
   second means sensing air flow into the space and developing a voltage signal indicative of air velocity,
   timing means operative to always periodically close a power supply circuit to said motor for a variable portion of a repetitive fixed period of time, said variable portion being related to the voltage supplied to the input of the timing means,
   and means supplying the difference between said voltage signals to said input.

9. A control according to claim 8 including logic means receiving a voltage signal from said first means and from said second means and energizing the motor windings to drive the motor in the direction to open or close the damper as indicated appropriate by such voltage signals.

10. A control according to claim 9 in which the magnitude of the voltage signal of the first means indicates the amount and direction of deviation of the space temperature from the set point.

11. A control according to claim 10 in which the logic means compares the voltage signals from the first and second means.

12. An electronic control for positioning the damper in a variable air volume system, comprisng,
    a motor for opening and closing a damper,
    thermostat means having a selectable set point and a sensor positioned in the conditioned space and operative to produce a voltage signal indicative of the space temperature relative to the set point,
    air flow sensing means sensing the air flow to the conditioned space and operative to produce a voltage signal indicative of air velocity,
    means subtracting one voltage signal from the other to produce a third voltage signal,
    timing means operative to always periodically energize said motor for a variable portion of a repetitive fixed period of time, said timing means being responsive to said third voltage signal to vary said variable portion and the effective motor speed is reduced as the sensed conditions approach equilibrium.
    and means responsive to the first two said voltage signals to energize the appropriate motor windings to open or close the damper as appropriate.

13. A control for positioning the damper in a variable air volume system, comprising,
    a motor for opening and closing a damper,
    thermostat means sensing temperature in a conditioned space and developing a voltage signal indicative of the temperature in the space relative to the thermostat setting,
    air flow sensing means positioned to sense the air flow to the conditioned space and developing a voltage signal indicative of air velocity,
    timing means operative to always periodically close a power supply circuit to said motor for some portion of a repetitive fixed period of time and being responsive to the difference between said voltage signals to determine the effective speed of said motor,
    and means responsive to both said voltage signals to determine direction of rotation of said motor to open or close the damper slower as equilibrium between the space temperature and the thermostat setting is approached.

* * * * *